United States Patent
Giannini et al.

(10) Patent No.: US 11,434,311 B2
(45) Date of Patent: Sep. 6, 2022

(54) THREE DIMENSIONAL DEPOSITION METHOD TO CREATE LAYERS OF POLYMERIC MATERIAL ONTO AN OBJECT

(71) Applicant: Huntsman International LLC, The Woodlands, TX (US)

(72) Inventors: Giacomo Giannini, Tervuren (BE); Johan Van Dyck, Meeuwen-Gruitrode (BE); Kevin Van Looy, Kampenhout (BE); Hugo Verbeke, Wilsele (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 430 days.

(21) Appl. No.: 16/068,747

(22) PCT Filed: Jan. 4, 2017

(86) PCT No.: PCT/EP2017/050115
§ 371 (c)(1),
(2) Date: Jul. 9, 2018

(87) PCT Pub. No.: WO2017/133855
PCT Pub. Date: Aug. 10, 2017

(65) Prior Publication Data
US 2019/0048105 A1 Feb. 14, 2019

(30) Foreign Application Priority Data
Feb. 4, 2016 (EP) .................................... 16154276

(51) Int. Cl.
| | | |
|---|---|---|
| *B29D 35/06* | (2010.01) | |
| *C08F 2/48* | (2006.01) | |
| *A43B 23/02* | (2006.01) | |
| *B29C 41/08* | (2006.01) | |
| *C08G 18/67* | (2006.01) | |
| *C08G 18/24* | (2006.01) | |
| *C08G 18/42* | (2006.01) | |
| *A43B 23/24* | (2006.01) | |
| *B05D 3/06* | (2006.01) | |
| *B29D 35/04* | (2010.01) | |
| *C09D 175/16* | (2006.01) | |
| *C08G 18/76* | (2006.01) | |
| *B05D 1/02* | (2006.01) | |

(52) U.S. Cl.
CPC ............ *C08F 2/48* (2013.01); *A43B 23/0215* (2013.01); *A43B 23/0235* (2013.01); *A43B 23/24* (2013.01); *B05D 3/067* (2013.01); *B29C 41/08* (2013.01); *B29D 35/04* (2013.01); *B29D 35/06* (2013.01); *B29D 35/068* (2013.01); *C08G 18/244* (2013.01); *C08G 18/4238* (2013.01); *C08G 18/6795* (2013.01); *C08G 18/7671* (2013.01); *C09D 175/16* (2013.01); *B05D 1/02* (2013.01); *C08G 2410/00* (2013.01)

(58) Field of Classification Search
CPC ...... C08F 2/48; C08F 18/244; C08F 18/6795; B29C 41/08; B29D 35/06; B29D 35/068
See application file for complete search history.

(56) References Cited

U.S. PATENT DOCUMENTS

| | | |
|---|---|---|
| 4,150,164 A | 4/1979 | Gerek et al. |
| 6,521,298 B1 | 2/2003 | Banks |
| 2005/0074553 A1 | 4/2005 | Takahashi et al. |
| 2005/0196605 A1 | 9/2005 | Ramsey |
| 2006/0141228 A1 * | 6/2006 | Rearick ............ C08G 18/0823 428/212 |
| 2015/0282565 A1 | 10/2015 | Kilgore |

FOREIGN PATENT DOCUMENTS

| | | |
|---|---|---|
| WO | 2007041049 A | 4/2007 |
| WO | 2012004088 A | 1/2012 |

\* cited by examiner

*Primary Examiner* — Jacob T Minskey
(74) *Attorney, Agent, or Firm* — Huntsman International LLC; Robert Diaz

(57) ABSTRACT

A process for providing one or more thermoset polymeric materials onto an object is disclosed wherein said process comprises at least the following steps:
Providing a polymeric composition having a viscosity >10 Pa.s at room temperature comprising at least one cross-linkable polymeric material; and then
Optionally heating the polymeric composition to achieve a liquid cross-linkable polymeric composition having a viscosity below 4 Pa.s, and then
Depositing the polymeric composition onto an object using a spray, swirl or extrusion nozzle and wherein the deposition is performed while the object and/or nozzle are moving to create an object at least partly coated with said polymeric composition; and then
Optionally cooling down the at least partly coated object to room temperature, and then
Optionally repeating one of foregoing steps, and then
Applying a cross-linking treatment selected from radical curing, UV curing and/or heat treatment in order to convert the cross-linkable polymeric material(s) into thermoset polymeric material(s).

10 Claims, No Drawings

THREE DIMENSIONAL DEPOSITION METHOD TO CREATE LAYERS OF POLYMERIC MATERIAL ONTO AN OBJECT

CROSS-REFERENCE TO RELATED APPLICATIONS

This application is the National Phase of International Application PCT/EP2017/050115 filed Jan. 4, 2017 which designated the U.S. and which claims priority to European App. Serial No. 16154276.6 filed Feb. 4, 2016. The noted applications are incorporated herein by reference.

FIELD OF INVENTION

The present invention relates to cross-linkable polymers, preferably thermoplastic polyurethane polymers, containing radically polymerizable compounds in its polymer backbone that can be used in a deposition process according to the invention, preferably in a 3 dimensional (3D) deposition (spray) process and the conversion of the cross-linkable polymers into a thermoset elastomeric polymer.

The present invention further relates to a novel deposition method to create layers of polymeric material onto an object.

The present invention further relates to a polymeric material, preferably thermoplastic, which is suitable for use in a nozzle and which avoids or eliminates sagging of the polymeric material after spraying.

The present invention further relates to an improved and cost efficient method for making shoes, more in particular for making shoe uppers with more design freedom and to respond to the trend of making tailor made articles.

BACKGROUND OF THE INVENTION

Polyurethanes and especially thermoplastic polyurethanes (TPU) in its many forms are preferred polymeric materials to make just about any part of a sports shoe from the foamed midsole on a running shoe to the hard studs of a moulded football boot. It is also often the material of choice for the new generation of vibrantly coloured products.

TPU's are well-known, in particular, for their very high tensile and tear strength, high flexibility at low temperatures, extremely good abrasion and scratch resistance. TPU's are also known for their superior dynamic properties, in particular, very high rebound figures, low compression set and hysteresis loss.

The use of thermoplastic polyurethanes has grown and grown, whether it's for trim, decoration or studs on a shoe. Sports shoes in particular must be built to include a variety of physical attributes, including grip, abrasion resistance and shock absorption. This is usually done by making different parts from different polymeric materials and then joining them together with glue which requires additional processing steps and hence is time consuming.

For all reasons above indicated there is a need to develop a less time consuming process to make a shoe, more in particular a shoe upper comprising different parts of polymeric materials preferably having elastomeric properties (optionally with different colours and/or different characteristics) thereby avoiding the use of glue to assemble the different parts.

U.S. Pat. No. 4,150,164 discloses a powder spray process to deposit finely divided thermosettable resinous particles (typically epoxy powders) to various kinds of substrates and in particular to thin metal substrates. The substrates are first heated to temperatures above the softening point of the particles and the particles are then propelled towards the substrate to cause said particles to flow upon said substrate to coat said substrate with a continuous, thin coating. Optionally the deposited coating is post-heated to mature the coating. This process is not suitable for applications according to the current invention.

US 2005/0074553 discloses a process to deposit a polyurethane varnish to impregnate an electrical coil. The impregnation and curing treatment method comprises a preliminary heating step in which an article having a coil is heated to a preliminary heating temperature at which the viscosity of the polyurethane varnish decreases and is above the drying temperature. The polyurethane varnish is continuously applied to the coil while rotating the heated coil at a constant speed, and a high-temperature rotary drying step in which the polyurethane varnish is dried while heating said polyurethane varnish at a drying temperature. This process is not suitable for applications according to the current invention.

US2005/0196605 discloses coating compositions which are curable using ultraviolet and visible radiation. In addition, U.S.'605 discloses a process to coat flexible objects such as but not limited to flexible metal objects with said coating composition. U.S.'605 does not disclose deposition of a suitable liquid thermoplastic polymeric composition to create thermoset polymeric coatings. U.S.'605 is not suitable for applications according to the current invention wherein dripping during application (spraying) is avoided.

AIM OF THE INVENTION

It is a goal of the invention to develop a novel concept for fabricating and/or coating three dimensional (3D) objects thereby using spray techniques and making use of predominantly cross-linkable polymeric materials and thereby avoiding the use of glue and/or stitching and avoiding dripping of the cross-linkable polymeric materials during spray.

It is a further goal to develop a deposition process which is suitable to deposit cross-linkable polymeric materials onto a pre-shaped object, which might be seen as temporary or intermediate, in order to create 3D objects in (predominantly) thermoset polymeric materials preferably having elastomeric properties.

It is a further goal to develop a deposition process which is suitable to deposit polymeric materials onto a pre-shaped object (which may be temporary) thereby giving rise to an improved and cost efficient method for making shoes, more in particular for making shoe uppers and thereby creating more design freedom and responding to the trend of making tailor made articles.

SUMMARY OF THE INVENTION

According to a first aspect of the invention, a process for providing one or more thermoset polymeric materials onto an object is disclosed. Said process having at least the following steps:
  Provide a thermoplastic polymeric composition having a viscosity above 10 Pa.s at room temperature comprising at least one cross-linkable polymeric material; and then
  Optionally heat the polymeric composition to achieve a liquid cross-linkable polymeric composition having a viscosity below 4 Pa.s, and then
  Deposit the polymeric composition onto an object using a spray, swirl or extrusion nozzle and wherein the deposition is performed while the object and/or nozzle are moving to create an object at least partly coated with said polymeric composition; and then Optionally cool down the at least partly coated object to room temperature, and then Optionally repeat one of foregoing steps, and then Apply a cross-linking treatment selected from radical curing, UV curing and/or heat treatment in order to convert the cross-linkable polymeric material(s) into thermoset polymeric material(s)

According to embodiments, the step of depositing the polymeric composition onto the object using a spray, swirl or extrusion nozzle is performed while the object is moving and the nozzle is fixed.

According to embodiments, the polymeric composition used in the process according to the invention is heated up to temperatures in the range 60° C.-120° C. before deposition, preferably in the range 70° C.-90° C.

According to embodiments, the step of depositing the polymeric composition onto the object using a spray, swirl or extrusion nozzle is performed while the object is having a temperature below the temperature of the polymeric composition (said polymeric composition being at a temperature at which the viscosity is below 4 Pa.s).

According to embodiments, the object used in the process according to the invention is a pre-shaped object which is an intermediate or temporary object which can be removed after the cross-linking step, optionally with the aid of a release agent, and the cross-linked thermoset polymeric material defines a three dimensional object made of at least one thermoset polymeric material.

According to embodiments, the at least one cross-linkable polymeric material used in the process according to the invention is selected from a cross-linkable thermoplastic polyurethane (TPU) wherein the TPU chains contain radically polymerizable unsaturated groups at the end of the TPU chains and one or more ethylenically unsaturated compounds serving as co-cross linker.

According to embodiments, the at least one cross-linkable polymeric material used in the process according to the invention comprises a cross-linkable thermoplastic polyurethane (TPU) having radically polymerizable unsaturated groups selected from the group of polyalkylene glycol mono methacrylates and/or polyalkylene glycol mono acrylates and combinations thereof at the end of the TPU chains and wherein said TPU has a number average molecular weight in the range 5000-12000 g/mol.

According to embodiments, the at least one cross-linkable polymeric material used in the process according to the invention comprises a cross-linkable thermoplastic polyurethane (TPU) having radically polymerizable unsaturated groups at the end of the TPU chains and one or more ethylenically unsaturated compounds serving as co-cross linker wherein said ethylenically unsaturated compounds are selected from mono acrylates and/or mono methacrylates and combinations thereof.

According to embodiments, the thickness of the deposited thermoset polymeric material(s) is depending on the velocity of the nozzle and/or melt viscosity of the cross-linkable polymeric material and is in the range of 0.05 mm up to 5 mm, preferably in the range 0.1 up to 3 mm.

According to embodiments, the deposited thermoset polymeric material(s) is having elastomeric properties.

According to embodiments, the object used in the process according to the invention is a shoe sock and the deposited cross-linkable polymeric material creates at least part of a shoe upper.

According to embodiments, the at least partly coated object comprises thermoset elastomeric polymeric materials with different mechanical properties and/or thermo stability properties and/or colours.

According to a second aspect of the invention, a three dimensional (3D) object comprising at least one thermoset elastomeric polymeric material obtained according to the process according to the first aspect of the invention is disclosed.

According to embodiments, the invention discloses a shoe containing a shoe upper wherein said shoe upper is at least partly created according to the first aspect of the invention.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying examples which illustrate, by way of example, the principles of the invention.

DEFINITIONS AND TERMS

In the context of the present invention the following terms have the following meaning:

1) The isocyanate index or NCO index or index is the ratio of NCO-groups over isocyanate-reactive hydrogen atoms present in a formulation, given as a percentage:

$$\frac{[NCO] \times 100(\%)}{[\text{active hydrogen}]}$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is not only considered from the point of view of the actual polymerisation process preparing the material involving the isocyanate ingredients and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are also taken into account in the calculation of the isocyanate index.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

4) The word "average" refers to number average unless indicated otherwise.

5) "Liquid" means having a viscosity of less than 10 Pa.s measured according to ASTM D445-11a.

6) The term "room temperature" refers to temperatures of about 20° C., this means referring to temperatures in the range 18° C. to 25° C. Such temperatures will include, 18° C., 19° C., 20° C., 21° C., 22° C., 23° C., 24° C., and 25° C.

7) The term "elastomer" or "material having elastomeric properties" refers to a material that will resume its original shape after being deformed and they can be stretched many times and will then elastically recover to their original shape when released.

8) The term "reaction system" refers to a combination of ingredients wherein the polyisocyanate composition is kept in a container separate from the isocyanate-reactive ingredients.

9) The term "polyurethane", as used herein, is not limited to those polymers which include only urethane or polyurethane linkages. It is well understood by those of ordinary skill in the art of preparing polyurethanes that the polyurethane polymers may also include allophanate, carbodiimide, uretidinedione, and other linkages in addition to urethane linkages.

1) The term "thermoplastic" as used herein refers in its broad sense to a material that is reprocessable at an elevated temperature, whereas "thermoset" refers to a material that exhibits high temperature stability without such reprocessability at elevated temperatures.

2) The term "urea group free" is used herein to refer to a polymer backbone with less than 0.1% free urea groups available for reaction with other molecules. Similarly, the terms isocyanurate free and oxazolinyl free are used to refer to a polymer backbone with less than 0.1% free isocyanurate or oxazolinyl groups available for reaction with other molecules. As used herein the term "pendant group free" is used to refer to a polymer backbone having less than 0.01%> of pendant groups containing polymerizable double bonds.

DETAILED DESCRIPTION

According to a first aspect of the invention, a process is disclosed for providing (at least partly) a polymeric material, said polymeric material preferably having elastomeric properties, onto an object thereby avoiding the use of glue and/or stitches. Said polymeric material being a thermoset polymeric material.

The process for providing parts of a thermoset polymeric material onto an object is further characterized as an automated process wherein several layers or parts of different thermoset polymeric material(s) may be provided onto said object in order to build up an object having a variety of physical attributes, including grip, abrasion resistance and shock absorption very high tensile and tear strength, high flexibility at low temperatures, extremely good abrasion and scratch resistance and/or to create additional decoration.

Therefore, the present invention provides a method which makes it possible to deposit a thermoset polymeric material onto an object, said method characterized as being time and cost efficient and thereby avoiding the use of glue and/or stitches.

According to embodiments, the method according to the invention is able to convert a thermoplastic polymeric material after deposition (e.g. after spraying) into a thermoset polymeric material.

The present invention therefore provides a novel deposition process which makes it possible to provide at least one thermoset polymeric material onto an object in order to form a 3 dimensional object which is at least partly coated with said thermoset polymeric material, said process having at least the following steps:

Provide a thermoplastic polymeric composition comprising at least one cross-linkable polymeric material having a viscosity >10 Pa.s at room temperature; and then Optionally heat the polymeric composition to achieve a liquid polymeric composition having a viscosity below 4 Pa.s, and then Deposit the polymeric composition using a spray, swirl or extrusion nozzle onto an object to create an at least partly coated object wherein the object and/or nozzle is moving; and then Optionally cool down the at least partly coated object to room temperature, and then Optionally repeat foregoing steps, and then Apply a cross-linking treatment selected from radical curing, UV curing and/or heat treatment in order to convert the cross-linkable polymeric material(s) into thermoset polymeric material(s).

According to embodiments, the object in the deposition process according to the invention may be an intermediate or temporary object which can be removed after the cross-linking step, optionally with the aid of a release agent, and the deposited cross-linked thermoset polymeric material defines a three dimensional object made of at least one thermoset polymeric material. The deposition method according to the invention thereby avoids or eliminates the use of moulds.

According to embodiments, the step of depositing the thermoplastic polymeric composition onto the object using a spray, swirl or extrusion nozzle is performed while the object is having a temperature below the temperature of the thermoplastic polymeric composition (said polymeric composition being at a temperature at which the viscosity is below 4 Pa.s) such that dripping of the polymeric composition on/from the object is avoided. Using a thermoplastic polymeric composition having a viscosity at room temperatures>10 Pa.s and spraying of the polymeric composition at temperatures such that the polymeric composition has a viscosity<4 Pa.s onto the object being at temperatures below the temperature at which the polymeric composition has a viscosity<4 Pa.s makes sure that the polymeric material is not dripping from the object.

According to embodiments, the nozzle in the deposition process according to the invention may be a swirl nozzle, more in particular a precision (pressure) swirl nozzle, preferably said spray nozzle is airless. These nozzles are known for their high-performance and creation of small droplet sizes. The stationary core induces a rotary fluid motion which causes the swirling of the fluid in the swirl chamber. A film is discharged from the perimeter of the outlet orifice producing a characteristic hollow cone spray pattern.

According to embodiments, the deposition process is preferably performed using airless or gasless spray techniques in order to avoid inclusion of oxygen ($O_2$) because $O_2$ could hinder the UV polymerization. Alternatively, the deposition process may be performed using inert gases such as nitrogen ($N_2$).

According to embodiments, the thickness of the deposited thermoplastic polymeric composition in the deposition process according to the invention is depending on the type and deposition velocity of the nozzle and the (melt) viscosity of the thermoplastic polymeric composition at the deposition temperature.

According to embodiments, the object, which may be a pre-shaped and/or intermediate object onto which thermoplastic polymeric material is provided using the spray process according to the invention is a shoe sock and the sprayed thermoplastic polymer creates at least part of a shoe upper.

According to embodiments, the at least partly coated object (after depositing the polymeric composition(s)) according to the invention may comprise several (different) thermoset polymer materials with different mechanical properties and/or thermo stability properties and/or colours.

According to embodiments, the at least one cross-linkable polymeric material may be selected from a thermoplastic polyurethane material.

According to embodiments, the thermoplastic polymeric composition is having a viscosity above 10 Pa.s. at room temperature (temperature of about 20° C.), preferably the thermoplastic polymeric composition is having a viscosity above 20 Pa.s. at room temperature.

According to embodiments, the at least one cross-linkable polymeric material suitable for use in the deposition process according to the invention may be cross-linkable thermoplastic polyurethane (TPU). TPU has the additional advantage that it is known to have intrinsic good adhesion with polyurethane (PU) which avoids the use of additional glue.

According to embodiments, the at least one cross-linkable polymeric material suitable for use in the deposition process according to the invention may be selected from cross-linkable thermoplastic polyurethane (TPU) wherein the TPU chains contain radically polymerizable unsaturated groups at the end of the TPU chains and one or more ethylenically unsaturated compounds serving as co-cross linker. TPU's are also known for their superior dynamic properties, in particular, very high rebound figures, low compression set and hysteresis loss.

According to embodiments, the at least one cross-linkable polymeric material suitable for use in the deposition process according to the invention may be selected from a cross-linkable thermoplastic polyurethane (TPU) having radically polymerizable unsaturated groups selected from the group of polyalkylene glycol mono methacrylates and/or polyalkylene glycol mono acrylates and combinations thereof at the end of the TPU chains and wherein said TPU has a number average molecular weight in the range 5000 g/mol to 12000 g/mol. Preferably said TPU has a number average molecular weight of 5000 g/mol to 12000 g/mol, more preferably between 5000 g/mol and 10000 g/mol, most preferably between 5000 g/mol and 8000 g/mol.

According to embodiments, the at least one cross-linkable polymeric material suitable for use in the deposition process according to the invention may be selected from a cross-linkable thermoplastic polyurethane (TPU) having radically polymerizable unsaturated groups at the end of the TPU chains and one or more ethylenically unsaturated compounds serving as co-cross linker wherein said ethylenically unsaturated compounds are selected from mono acrylates and/or mono methacrylates and combinations thereof.

According to embodiments, the at least one cross-linkable polymeric material suitable for use in the deposition process according to the invention may be selected from a cross-linkable thermoplastic polyurethane (TPU) and may be obtained according to the methods described in WO2012/004088 which is incorporated herein by reference.

According to embodiments, the cross-linkable thermoplastic polyurethanes (TPU) suitable for use in the deposition process according to the invention may be obtained by mixing and reacting at least following ingredients:
  one or more polyfunctional isocyanates,
  one or more polyfunctional polyols, and
  one or more monols or monoamines comprising radically polymerizable unsaturation(s), and
  optionally one or more diol chain extenders
together with one or more ethylenically unsaturated compounds serving as reactive diluent (also called co-crosslinker) to create cross linking of the final thermoplastic polyurethane.

According to embodiments, the cross-linking reaction of the cross-linkable thermoplastic TPU polymeric material(s) takes place after the process of depositing the cross-linkable mixture onto an object and during the step of applying a cross-linking treatment selected from radical curing, UV curing and/or heat treatment.

The reactants for forming the cross-linkable thermoplastic polyurethane (TPU) suitable for use in the deposition process according to the invention are generally selected from:
  one or more polyfunctional isocyanates, preferably difunctional polyisocyanates, and
  one or more difunctional hydroxy compounds, and
  one or more mono functional hydroxy and/or amine compounds comprising radically polymerizable unsaturation(s) serving as chain stopper, and
  optionally one or more chain extenders (typically a low molecular weight diol)
in such amounts that the isocyanate index is generally between 80 and 110%, preferably between 96 and 102%. The polyfunctional, preferably difunctional isocyanates may comprise any aliphatic, cycloaliphatic or aromatic isocyanates.

The one or more polyfunctional isocyanates used for forming the cross-linkable thermoplastic polyurethane (TPU) suitable for use in the deposition process according to the invention may consist essentially of pure 4,4'-diphenylmethane diisocyanate or mixtures of that diisocyanate with one or more other organic polyisocyanates, especially other diphenylmethane diisocyanates (MDI), for example the 2,4'-isomer optionally in conjunction with the 2,2'-isomer. The one or more polyfunctional isocyanates may also be an MDI variant derived from a polyisocyanate composition containing at least 95% by weight of 4,4'-diphenylmethane diisocyanate. Preferred polyfunctional isocyanates are those containing at least 90% by weight of 4,4'-diphenylmethane diisocyanate or its hydrogenated derivative. More preferably, the 4,4'-diphenylmethane diisocyanate content is at least 95% by weight, and most preferably at least 98% by weight.

The one or more difunctional hydroxy compounds, preferably diols, used for forming the cross-linkable thermoplastic polyurethane (TPU) suitable for use in the deposition process according to the invention generally have a molecular weight of between 500 and 20000 and may be selected from polyesteramides, polythioethers, polycarbonates, polyacetals, polyolefins, polysiloxanes and, especially, polyesters and polyethers or mixtures thereof.

Polyether diols used for forming the cross-linkable thermoplastic polyurethane (TPU) suitable for use in the deposition process according to the invention may include products obtained by the polymerization of a cyclic oxide, for example ethylene oxide, propylene oxide, butylene oxide or tetrahydrofuran in the presence, where necessary, of difunctional initiators. Suitable initiator compounds contain 2 active hydrogen atoms and include water, butanediol, ethylene glycol, propylene glycol, diethylene glycol, triethylene glycol, dipropylene glycol, 1,3-propane diol, neopentyl glycol, 1,4-butanediol, 1,5-pentanediol, 2-methyl-1,3-propanediol, 1,6-pentanediol and the like. Mixtures of initiators and/or cyclic oxides may be used.

Polyester diols used for forming the cross-linkable thermoplastic polyurethane (TPU) suitable for use in the deposition process according to the invention may include hydroxyl-terminated reaction products of dihydric alcohols such as ethylene glycol, propylene glycol, diethylene glycol, 1,4-butanediol, neopentyl glycol, 2-methyl-1,3-propanediol, 1,6-hexanediol or cyclohexane dimethanol or mixtures of such dihydric alcohols, and dicarboxylic acids or their esterforming derivatives, for example succinic, glutaric and adipic acids or their dimethyl esters, sebacic acid, phthalic anhydride, tetrachlorophthalic anhydride or dimethyl terephthalate or mixtures thereof. Polycapro lactones and unsaturated polyesterpolyols should also be considered.

Suitable low molecular weight (generally below 400) difunctional compounds that serve as chain extenders used for forming the cross-linkable thermoplastic polyurethane (TPU) according to the invention may include diols, such as aliphatic diols like ethylene glycol, 1,3-propanediol, 2-methyl-1,3-propanediol, 1,4-butanediol, 1,5-pentanediol, 1,6-hexanediol, 1,8-octanediol, 1,9-nonanediol, 1,10-decanediol, 1,12-dodecanediol, 1,2-propanediol, 1,3-butanediol, 2,3-butanediol, 1,3-pentanediol, 2-ethyl-butanediol, 1,2-hexanediol, 1,2-octanediol, 1,2-decanediol, 3-methyl-pentane-1,5-diol, 2-methyl-2,4-pentanediol, 3-methyl-1,5-pentanediol, 2,5-dimethyl-2,5-hexanediol, 3-chloro-propanediol, 1,4-cyclohexanediol, 2-ethyl-2-butyl-1,3-propanediol, diethylene glycol, dipropylene glycol and tripropylene glycol, 1,4'-butyl enediol, 3-hydroxy-2,2-dimethyl-propanoic acid, aminoalcohols such as ethanolamine, N-methyldiethanolamine and the like, diamines, hydrazines and hydrazides and mixtures thereof. Preferred are diols such as hexanediol, 1,4-butanediol or ethylene glycol. 1,4-Butanediol is most preferred. Di-esters of terephthalic acid with glycols having 2 to 4 carbon atoms, e.g. terephthalic acid bis(ethylene glycol) or bis-1,4-butanediol, and hydroxyalkylene ethers of hydroquinone, and polyoxytetramethylene glycols having molecular weights of from 162 to 378, are also suitable. Preferably the reaction mixture does not contain any low molecular weight triol.

The amount of chain stopper used for forming the cross-linkable thermoplastic polyurethane (TPU) according to the invention may be such that the molecular weight (MW) of the final cross-linkable thermoplastic polyurethane (TPU) can be controlled and be comprised between 5,000 and 12,000 g/mol. The amount of chain stopper is typically from 0.08 mmole/g of cross-linkable mixture to 0.35 mmole/g of cross-linkable mixture, preferably from 0.12 mmole/g of cross-linkable mixture to 0.25 mmole/g of cross-linkable mixture.

The co-cross-linkable ethylenically unsaturated compounds used for forming the cross-linkable thermoplastic polyurethane (TPU) suitable for use in the deposition process according to the invention which serve as a reactive diluent lie dormant during initial processing and polymerize if subjected to appropriate polymerization conditions. The co-cross-linker contains at least one polymerizable unsaturated group, preferably a radically polymerizable group. Examples of such ethylenically unsaturated compounds are dipentaerythritol penta acrylate, trimethylolpropane tri methacrylate, ditrimethylolpropane tri acrylate, pentaerythritol tetra acrylate, trimethylolpropane tri acrylate, butanediol di methacrylate, ethoxylated pentaerythritol tetra acrylate, hexanediol di methacrylate, hexanediol di acrylate, lauryl methacrylate, 2-phenoxyethyl methacrylate, 2-phenoxyethyl acrylate, polyethyleneglycol di acrylate, polypropyleneglycol di acrylate, polycaprolactone di acrylate. Most preferred are mono acrylates and mono methacrylates or combinations thereof.

The viscosity of the cross-linkable thermoplastic polyurethane (TPU) used as polymeric material in the cross-linkable polymeric composition of the invention may be adjusted by altering the relative amounts of the TPU and the ethylenically unsaturated compounds, the latter serving as a reactive diluent and forming part of the final cross-linked material. Generally the amount of TPU is between about 45 wt % and 70 wt % and the amount of ethylenically unsaturated compounds is between about 55 wt % and 30 wt % based on the total cross-linkable mixture. Preferably the amount of TPU is between 45 wt % and 60 wt % and the amount of ethylenically unsaturated compounds is between 55 wt % and 40 wt %.

The ratio of TPU and co-cross-linker, the hard block content of the TPU, the molecular weight of the TPU and the type of chain stopper used for forming the cross-linkable thermoplastic polyurethane (TPU) according to the invention may be chosen in such a way that the final viscosity of the thermoplastic polymeric composition of the invention has a viscosity value at 60° C. below 500 Pa.s, preferably below 300 Pa.s, more preferably in the range 5-120 Pa.s. The thermoplastic polymeric composition is having a viscosity above 10 Pa.s. at room temperature (temperature of about 20° C.), preferably the thermoplastic polymeric composition is having a viscosity above 20 Pa.s. at room temperature.

The invention also allows further controlling the hard block content of the at least one cross-linkable thermoplastic polyurethane (TPU) that is used as cross-linkable polymeric material; especially one can control the processing and final use temperature of the final products in addition to the thermos-mechanical performance. The hardness of the materials of the invention can be varied by changing the amount of hard block level in the thermoplastic polyurethane. Typically, the hard block level is varied between 7 and 60 wt % with hard block level being defined as the weight percentage of chain extender, chain stopper and isocyanate in the TPU; preferred values are from 10 wt % to 50 wt %. Generally the number of urethane groups per kg of acrylate resin is between 0.5 and 2.5 and preferably between 0.5 and 1.5.

Other conventional ingredients (additives and/or auxiliaries) may be used in making the at least one cross-linkable thermoplastic polyurethane (TPU) that is used in the invention. These include catalysts, surfactants, flame proofing agents, fillers, pigments (to provide different colors), stabilizers and the like. Catalysts which enhance the formation of urethane and urea bonds may be used, for example, tin compounds, such as a tin salt of a carboxylic acid, e.g. dibutyltin dilaurate, stannous acetate and stannous octoate; amines, e.g. dimethylcyclohexylamine and triethylene diamine.

The reactants used to make the at least one cross-linkable thermoplastic polyurethane (TPU) according to the invention may be applied using the so-called one-shot, semiprepolymer or prepolymer method known in the art by a batch or continuous process known to the person skilled in the art. The TPU's thus produced are dissolved into a reactive diluent, and can be processed according to known techniques. All reactants can be reacted at once, or can be reacted in a sequential manner into the reactive diluent. By prior mixing of all or part of the unsaturated chain stopper of the invention with all or part of the isocyanate-reactive compounds solutions or suspensions or dispersions are obtained, depending on the unsaturated chain stopper and isocyanate reactive compounds used. The various components used in the manufacture of the cross-linkable TPU mixture of the invention can in fact be added in any order.

For example, one may use a prepolymer of polyisocyanate and polyol, then add the diol and the monol, or one may use a prepolymer of polyisocyanate and polyol and the monol, then add the diol in the process for making the cross-linkable thermoplastic polyurethane (TPU) used in the invention.

Alternatively, the cross-linkable polymeric material may comprise or be selected from thixotropic polymers.

Before providing the polymeric composition comprising at least one cross-linkable polymeric material, preferably the cross-linkable thermoplastic polyurethane (TPU) material(s) according to the invention in the spray nozzle, the polymeric composition may be heated to achieve a viscosity value suitable for spray and not too liquid to avoid sagging off the object after spraying. The viscosity after heating up to temperatures in the range 60° C. up to 120° C., preferably at temperatures of about 80° C. is maximum 4 Pa.s, preferably in the range 3-3.5 Pa.s.

Upon cross-linking (during the step of applying a cross-linking treatment) there will be a chemical bond created between the polymeric material (e.g. TPU) and the (acrylic) polymer (at the interface with the interpenetrating polymer formed from the (mono) functionalized monomer). The covalent link formed during the cross-linking step is taking place substantially at the end of the polymeric molecules (e.g. at the end of the TPU chain) which means that the phase structure and chain mobility of the cross-linked material is not disadvantageously disturbed.

According to embodiments, cross-linking of the at least one cross-linkable polymeric material (e.g. TPU) in the polymeric composition can be initiated either via the thermal route or via the actinic route, including UV and electron beam (EB) radiation.

According to embodiments, thermal cross-linking initiators may be added to the cross-linkable polymeric composition beforehand. Said compounds suitable as thermal cross-linking initiators are organic peroxides such as dicumylperoxide, 2,5-dimethyl-2,5-di(tert.-butyl)peroxide, 2,5-Bis(tert.-butylperoxide)-2,5-dimethyl-3-hexyne, di-tert.-butylperoxide, 2,5-Bis(tert.-butylperoxide)-2,5-dimethyl-hexane, Bis(tert.-butylperoxyisopropyl)benzene, m-octadexylazoformate and tert.-butyl peroxycumene, tert.-butyl peroxy 2-ethylhexylcarbonate. A preferred cross-linker is tert.-butyl peroxy 2-ethylhexylcarbonate.

Another method for cross-linking is exposure to actinic radiation such as ultraviolet light or electron beam for an appropriate period of time.

According to embodiments, UV initiators may be added to the cross-linkable polymeric composition. Typical UV initiators comprise ketones such as 1-hydroxy cyclohexylphenylketone, 2,2- dimethoxy- 1,2-diphenylethan- 1 -one, 1 - [4-(2-hydroxyethoxy)-phenyl]-2-methyl- 1 - propanone (HHPMP), and (bis)acylphosphineoxides such as bis(2,4,6-trimethylbenzoyl)- phenyl-phosphoneoxide (BTPPO).

According to a second aspect of the invention a three dimensional (3D) object is disclosed comprising at least one thermoset (elastomeric) polymeric material obtained by using the above described deposition process.

According to embodiments, the three dimensional (3D) object comprising at least one thermoset (elastomeric) polymeric material obtained by using the above described deposition process is a shoe containing a shoe upper wherein said shoe upper is at least partly created according to the deposition process of the invention.

Using the deposition method according to the invention makes it possible to create a shoe with different parts made of different (thermoset) polymeric materials having different hardness, different stiffness and to realize this in precise and thin sections.

Using the spray method according to the invention makes it possible to have an automatized 3D shoe upper production thereby avoiding the use of glue and/or stitches leading to a reduction in labour cost up to 90%. The deposition method further eliminates the use of expensive mould designs.

Possible further applications in the shoe manufacturing include:

Modification of existing shoes with local protection pads (e.g. safety shoe toe cap covers)
Any type of coating to heavy duty consumer goods to protect them from impact
Adding decorative elements to a shoe (upper), . . .
The invention is illustrated with the following examples.

EXAMPLES

Chemicals Used:
Isocyanate Suprasec® 1306 (obtained from Huntsman)
Polyol Daltorez® P765 (obtained from Huntsman)
Irganox® 1010
Metal catalyst Metatin® S 26
t-Butylacetate
1,4 butanediol (BDO)
Mono-functional aromatic acrylic monomer (50% SR®410 and 50% SR®7905 obtained from Arkema)
Polypropyleneglycole monomethacrylate (Bisomer® PPM® 5LI, obtained from GEO Specialty Chemicals)
Formulation (Ingredients Mentioned in wt %) to Obtain Cross-Linkable Polymeric Material (UV Curable Polyurethane (PU))

14.91% Suprasec ® 1306
7.26% Bisomer ® PPM ® 5LI
43.13% Daltorez ® P 765
2.13% Irganox ® 1010
0.0041% catalyst solution (Metatie ® S26 and t-butylacetate 10/90 mixture)
2.55% BDO
15% SR ® 410
15% SR ® 7905

Experimental Set Up: Preparation of Cross-Linkable Polymeric Material (UV Curable Polyurethane (PU))

An oil bath is preheated to 80° C. and to a 1000 ml flask (preheated at 60° C.), 91.28 g of Suprasec® 1306 is added.

The flask is then put under nitrogen and the Suprasec® 1306 is being stirred.

The flask is then heated in the oil bath until 80° C.

44.37 g of Bisomer® PPM® 5LI is added (which has been dried beforehand using molecular sieves)

Let the mixture react for about 90 minutes.

Start adding 276.78 g polyol (dried Daltorez® P765 with 0.47% Irganox® 1010) slowly over 30 minutes.

0.0250 g of catalyst (0.3018 g Metatin® S 26 in 3.1010 g t-butylacetate) was added to the mixture and the mixture was left to react for about 90 minutes.

Then a calculated amount of BDO was added (in this experiment it was 15.1663 g BDO) dropwise until a NCO value of 100 is obtained After approximately 5 minutes the acrylate (50% SR®410 and 50% SR®7905) was added to the mixture in a desired ratio (in this experiment 70% TPU=416.17 g and 30% acrylate=178.36 g)

Experimental Set Up: Spray UV Curable Polyurethane (PU)

The UV curable PU was heated to 110° C. before spray in order to obtain the desired viscosity<4 Pa.s (the measured viscosity was 3.4 Pa.s). A layer with final thickness ranging from 0.3 mm to 1.7 mm was sprayed using a precision swirl tool in a circular (swirl) motion. The nozzle was moving using a robot while the sample was fixed and the speed of the precision swirl can be changed to make coatings which are thicker (slower) or thinner (faster).

The coated samples were then cured to fixate the deposited polyurethane using a F300 UV-light curing machine (Fusion LC6E equipped with a Fusion I300 & I6 UV lamp from DESMA). The photo initiator used for the UV curing was Irgacure® 500 (0.5% in the UV curable PU).

The invention claimed is:

1. A process for producing a three dimensional object made of one or more thermoset polymeric materials having elastomeric properties, said process having at least the following steps:
   providing a thermoplastic polymeric composition having a viscosity >10 Pa.s at room temperature measured according to ASTM D445-11a and comprising at least one cross-linkable thermoplastic polyurethane material containing radically polymerizable unsaturated groups; and then
   heating the polymeric composition to achieve a liquid cross-linkable polymeric composition having a viscosity below 4 Pa.s measured according to ASTM D445-11a, and then
   depositing the polymeric composition onto a pre-shaped object using a spray, swirl, or extrusion nozzle and wherein the deposition is performed while the pre-shaped object or nozzle are moving to at least partly coat the pre-shaped object with said polymeric composition; and then
   optionally, cooling down the at least partly coated pre-shaped object to room temperature, and then
   optionally, repeating one of foregoing steps, and then
   applying a cross-linking treatment selected from radical curing, UV curing, or heat treatment in order to convert the cross-linkable thermoplastic polyurethane material(s) into a cross-linked thermoset polymeric material(s); and
   removing the pre-shaped object from the cross-linked thermoset polymeric material(s) after the cross-linking step, optionally with the aid of a release agent, and wherein the cross-linked thermoset polymeric material defines the three dimensional object made of the thermoset polymeric material.

2. The process according to claim 1, wherein the step of depositing the polymeric composition onto the pre-shaped object using a spray, swirl, or extrusion is performed while the pre-shaped object is moving and the nozzle is fixed.

3. The process according to claim 1, wherein the polymeric composition is heated up to temperatures in the range 60° C.-120° C. before deposition.

4. The process according to claim 1, wherein the step of depositing the polymeric composition onto the pre-shaped object is performed while the pre-shaped object has a temperature below the temperature of the resin having a viscosity below 4 Pa.s.

5. The process according to claim 1, wherein the at least one cross-linkable thermoplastic polyurethane material is having thermoplastic polyurethane chains containing radically polymerizable unsaturated groups at the end of the thermoplastic polyurethane chains and one or more ethylenically unsaturated compounds serving as co-cross linker.

6. The process according to claim 1, wherein the cross-linkable polymeric material comprises a cross-linkable thermoplastic polyurethane having radically polymerizable unsaturated groups selected from the group consisting of polyalkylene glycol mono methacrylates and/or polyalkylene glycol mono acrylates and combinations thereof and wherein said thermoplastic polyurethane has a number average molecular weight in the range 5000-12000 g/mol.

7. The process according to claim 1, wherein the cross-linkable polymeric material comprises a cross-linkable thermoplastic polyurethane having radically polymerizable unsaturated groups at the end of the TPU chains and one or more ethylenically unsaturated compounds serving as co-cross linker wherein said ethylenically unsaturated compounds are selected from the group consisting of mono acrylates and/or mono methacrylates and combinations thereof.

8. The process according to claim 1, wherein the thickness of the deposited thermoset polymeric material(s) is in the range of 0.05 mm up to 5 mm.

9. The process according to claim 1, wherein the pre-shaped object is a shoe sock and the three dimensional object is at least part of a shoe upper.

10. The process according to claim 1, wherein the at least partly coated object comprises thermoset elastomeric polymeric materials with different mechanical properties and/or thermo stability properties and/or colours.

* * * * *